United States Patent [19]
Garfield et al.

[11] Patent Number: 5,161,296
[45] Date of Patent: Nov. 10, 1992

[54] METHOD OF SECURING AN ANCHOR WITH EXTRUSION PLASTIC MOLDING IN A SOLID WALL SUBSTRATE

[75] Inventors: Nathaniel H. Garfield, Harrison; Israel Nissenbaum, Brooklyn, both of N.Y.

[73] Assignee: Mechanical Plastics Corp, Elmsford, N.Y.

[21] Appl. No.: 737,634

[22] Filed: Jul. 30, 1991

[51] Int. Cl.$^5$ .................... B21J 15/02; B23P 11/02
[52] U.S. Cl. .................... 29/524.1; 29/525.2; 411/340
[58] Field of Search .................... 29/522.1, 523, 524.1, 29/525.1, 525.2, 240, 240.5, 469.5; 411/60, 340

[56] References Cited
U.S. PATENT DOCUMENTS 4,662,808 5/1987 Camilleri .................... 411/340
4,752,170 6/1988 McSherry et al. .................... 411/340 X Primary Examiner—Joseph M. Gorski
Assistant Examiner—Peter Dungba Vo
Attorney, Agent, or Firm—Israel Nissenbaum

[57] ABSTRACT

A method and an anchoring element for high strength solid wall anchoring in which a solid plastic plug is inserted in a hole in a solid wall of a porous material such as concrete. The invention provides a high strength compressive bonding between the plastic plug and the wall which simulates high strength chemical bonding. In order to effect the high strength compressive bonding, the plug is inserted into a hole in the wall having nominally the same dimension as the plug. A screw of substantially the same diameter as the plastic plug is inserted into the plug to provide the anchoring. The plastic of the plug is an extrudible material such as polypropylene, high density polyethylene and co-polymers, which is extruded against and into the solid wall of the hole by the rotary insertion of the screw. Continued rotation of the screw causes a very high compression of the plastic between adjacent threads of the screw and a thin, very highly compressed film, which substantially covers the threads. The extrusion and the highly compressed areas of plastic provide phenomenally high resistance to pull-out of the plug from the wall. The plastic plug further contains one or more hairline separations or cleavages which serve to guide the screw into a path in the center of the plug to maximize the extent of the circumferential extrusion.

10 Claims, 4 Drawing Sheets

METHOD OF SECURING AN ANCHOR WITH EXTRUSION PLASTIC MOLDING IN A SOLID WALL SUBSTRATE

BACKGROUND OF THE INVENTION

1. Field of the Invention

This invention relates to solid wall anchors and particularly to plastic plug solid wall anchors.

2. Description of Prior Art

In U.S. Pat. No. 4,752,170, with the same assignee as the present application, a solid wall anchor is described in which the anchor, having an overall bullet-like or plug appearance, is comprised of interfitting sections which form a solid plug of plastic, i.e. with a starter hole for the screw but without a central hollow. When a screw is inserted, the solid nature of the anchor permits it to support considerably more weight than other similar but hollowed out anchors because of the increase in compacted material within a given hole diameter. These anchors provide holding strength greater than or at least comparable to many types of metal anchors of similar dimension.

SUMMARY OF THE INVENTION

It is an object of the present invention to provide an inexpensive method for substantially increasing the holding strength of solid wall plastic anchors.

It is a further object of the present invention to provide a unique combination of plastic and screw which forms a very high strength anchoring element.

These and other objects, features and advantages of the present invention will become more evident from the following discussion and drawings in which:

DESCRIPTION OF THE INVENTION

Figure 1A:
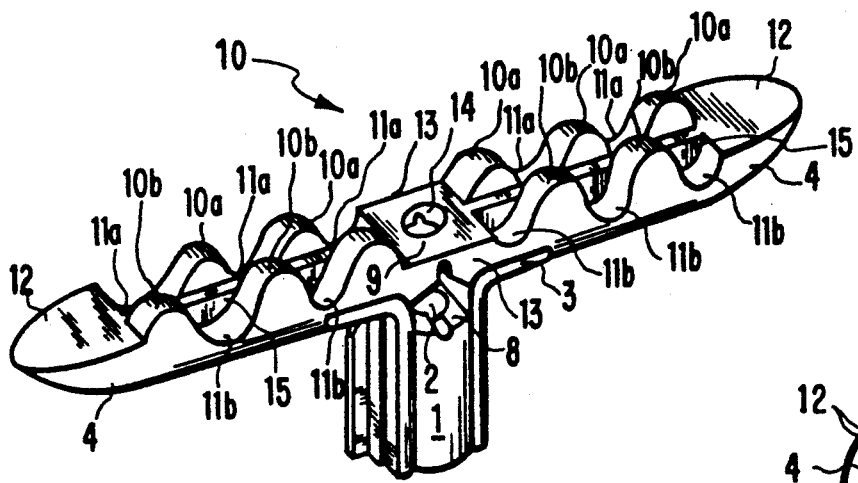
FIG. 1a is an isometric view and FIG. 1b is a side elevation view of an anchor of the aforementioned patent in the opened and closed positions respectively.

Generally the present invention comprises a method for high strength compressive bonding of a plastic plug to a solid wall or other substrate which forms an anchoring element. The invention comprises using a substantially solid plug of a plastic material, having specific mechanical properties, into which a screw, of specific dimensions, is threaded. The present invention further comprises a unique combination of plastic and screw which provides a very high strength anchoring element.

In accordance with the present invention, a solid, generally tubular plastic plug is inserted into a hole formed in a solid wall or other solid substrate. The hole is of initial depth sufficient to exceed the length of the plastic plug by an amount which will accommodate extrusion elongation of the plug, caused by the insertion of the screw, and to allow for complete screw engagement. For optimum utility, the hole depth should be at least about 30% and preferably at least 50% more than the original length of the plug. The screw should not however, be longer than the combined hole depth and thickness of item to be fastened.

The plastic plug, is preferably of uniform diameter or cross section along a substantial portion of its length, and it is inserted into the hole to a depth, above the bottom of the hole, sufficient to accommodate the extrusion elongation. The plastic plug is substantially equivalent in diameter to the diameter of the hole. In actual practice, drills, particularly for masonry and concrete, form holes very slightly larger (0.01–0.02" ($\frac{1}{4}$–$\frac{1}{2}$ mm)) than the nominally called out diameter to permit insertion of items having that diameter, without binding.

A screw of substantially the same diameter (±0.02" ($\frac{1}{2}$ mm) as the plug, is rotatably inserted into the plastic plug to provide the anchoring element. The screw may be a sheet metal screw, wood screw, lag bolt, (e.g. Type AB and BP tapping screws—ANSI/ASME B18.6.4; wood screws—ANSI/ASME B18.6.1; and lag screws—ANSI/ASME B18.2.1) or other similar screw capable of self tapping the plastic plug and having a thread of sufficient length for engagement with the fully elongated plug for optimum holding strength.

Generally, for maximum holding, the screw should have a length of threaded portion at least equal to 30% and preferably 50% more than that of the original plug length. Hole depth should be matched accordingly. Tapping screws having somewhat more threads/inch and screws with larger root sections will provide greater compression and holding strength. It is preferred that the screw have a head suitable for high torque such as a hex head, to facilitate insertion into the plug. A more substantial head is also preferred to sustain the very heavy loads that the anchor is capable of holding. The screw should also have a relatively sharp point for immediate and easy boring into the plastic of the plug in preference to pushing the anchor down into the hole. A dull point will tend, because of the very large screw diameter, to push the plug down into the insertion hole before engagement of the screw with the plug.

The plastic plug is preferably of substantially uniform outer dimensions along its inserted length to substantially conform with the uniform dimensions of the insertion hole. With highly extrudible materials the plastic plug may initially be slightly out of round with respect to the hole, if it is conformed to the hole with the insertion of the screw. The plastic plug is also substantially completely solid in the cross section along a substantial portion of its length.

In accordance with the present invention, the plastic of which the anchor is comprised must be a material which is extrudible or flowable under increased pressure and temperature exerted by the screw. This is in contrast to materials, such as the nylon or PVC of many plug anchors which merely stretch somewhat and are just cut by an inserted screw. In addition, the plastic material must also have high shear strength, on a molecular basis, and high compressibility in order to provide holding capability. Examples of such materials are polypropylene, high density polyethylene, and co-polymers thereof. It is preferred, for facilitated screw insertion, that the plastic be of a self lubricating type such as polypropylene. The nylon and PVC of common plug anchors do not have these qualities and there is a strong tendency of inserted screws to detrimentally bind, particularly if they are of larger sizes within the specified range.

The method of the present invention (comprising the utilization of a plastic plug, of a plastic having the above described characteristics, with a very large screw of specific dimension, relative to the size of the plug) operates, to effect the requisite high strength compressive bonding, it is believed, in the following unique manner. As the screw is inserted by rotary motion, the screw threads apply tremendous pressure to the highly confined plastic with increase in temperature sufficient to make the plastic flow and reshape itself in exact conformity with the wall surface of the hole. The plastic is spirally pressure extruded into many imperfections in the wall surface. In addition, plastic between threads of the screw is almost completely confined between the threads and the adjacent wall surface of the hole and is very highly compressed with extrusion against the wall surface. Only a very small amount of plastic can escape out of this confinement. A small amount of plastic becomes a thin film, in very high compression, between the outer periphery of the screw threads and the wall surface of the hole. It has been noted that the forward threads of the screw are flattened during insertion with a plastic film covering the flattened threads. With excessively oversized screws, the threads cut through the plastic before flattening thereby negating the utility of the anchor. Residual plastic is extruded forward of the screw. Because of the high extrusion pressures, the plug elongates to as much as 50% of its original length. Longitudinal hairline separations or cleavages in the plastic serve to guide the screw to ensure that plastic extrudes over a substantial circumference of the inserted screw threads. In particular, the alternating teeth of the anchor, shown in the above identified patent, tend to substantially completely surround and lock the screw into a proper central direction. Since the plastic remains capable of reshaping itself into conformation with the screw, the anchor can be re-used, without loss of holding power, if the original screw is unthreaded from the anchor.

It has not been considered possible to be able to provide a useful anchorage with an insertion hole, a plug anchor and a screw, all of substantially the same diameter or cross section, in a non-yielding material such as concrete. It is expected that either the screw cannot be inserted because of insufficient room for the screw, or if inserted, it will be unable to be rotated, and will "lock up" with resultant shearing of the screw. Alternatively, increased pressure, without relief, is expected to result in splitting of the substrate with considerable loss of holding power. With common plug anchors made of non-extrudible materials such as nylon or PVC, screws, when capable of being inserted, do indeed lock up and shear or the substrate cracks to provide room for expansion, even though the plugs already have central hollows which would tend to relieve some of the pressure.

All screw anchors, whether for solid walls or hollow walls, are marketed with instructions to utilize screws which have smaller diameters than that of the insertion hole. It has however been discovered, with anchors of materials such as polypropylene, and such as those made in accordance with the teachings of U.S. Pat. No. 4,752,170, the teachings of which are incorporated herein by reference thereto, that substantially matching screw size (±0.02" (½ mm)) with anchor diameter in a hole nominally having a diameter the same (up to +0.02" (½ mm)) as that of the anchor, provides unexpectedly high strength anchoring without problems of screw insertion, shearing or substrate breaking. With such utilization, the anchor undergoes a unique transformation in which the anchor becomes considerably elongated, the area between the threads of the screw are completely filled in with the material of the anchor in highly compressed form and a thin film of plastic covers a substantial portion of the outer edges of the screw threads. The thin film of plastic such as polypropylene also fills adjacent interstices of the walls of the insertion hole, in solid materials such as porous concrete. Utilization of a larger (by more than a minimal amount) screw than that of the insertion hole and the anchor, however, results in slicing through of the anchor material by the screw thread, and significant loss of holding power.

With anchors having the matched screw and which are removed from the concrete substrate, the diameter of the anchor is from about 10-20% greater than the initial diameter of the anchor and that of the hole. Accordingly, when the anchor is contained within the hole, the polypropylene is compressed to this extent, thereby providing a very high compression strength at the molecular level. The holding power of the anchoring element of the present invention, with the high strength compressive bonding and high compression, greatly exceeds that of similarly dimensioned metal anchors and is equivalent to or even better than high cost chemically bonded anchors. Dense materials having little yield capability such as the nylon of which plug anchors are generally formed, do not permit such extensive compression. Use of plastic plugs of such materials with matched size screws results in the inability to fully insert the screw, with the screw becoming locked-up in position such that additional turning pressure causes the screw itself to shear. Alternatively, with plugs of such materials, forced insertion of a screw causes the substrate, even high density concrete, to split.

In addition to the above characteristics, it has been discovered that plastic plug anchoring elements of the present invention are re-usable without significant loss of holding power. The extruded plastic, when re-extruded, simply reforms itself to the newly inserted screw with the same plastic compression and film formation even after the application of a substantial load. Other plastic anchors are simply cut to shreds by re-inserted screws.

It is also very important that the plastic plug be held in position in a manner sufficient to prevent spinning or forcing of the plug to the bottom of the insertion hole. Very large screws, upon initial insertion, are most likely to cause detrimental spinning which renders further insertion of the screw difficult, if not impossible. However, an excessively strong interface of the plastic plug with the wall of the hole will prevent insertion of the plug into the hole in the first instance. It is accordingly preferred that minimally dimensioned anti-rotational means, such as two or more small peripheral fins, be provided at the outer end of the plug, which wedge against the surface of the wall of the hole and thereby fix the plastic plug into position for rotational insertion of the screw without spinning or sinking.

DETAILED DESCRIPTION OF THE DRAWINGS

Figure 1B:
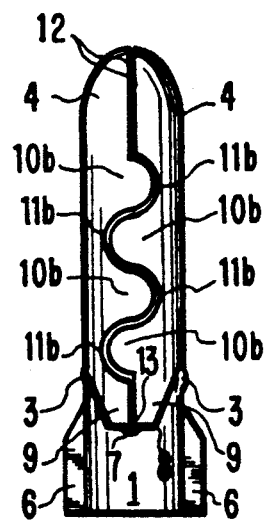

With reference to the drawings, FIG. 1a depicts prior art plastic plug anchor 10 with arms 4 in their molded, outstretched condition. The surfaces of the arms 4 are each configured in two sets (a and b) of successive wave crests 10a and 10b and troughs 11a and 11b which extend in direction parallel to the lengths of the arms 4. The sets of wave crests and troughs are staggered with respect to each other so that the wave crests 10a are aligned transversely on each arm with the troughs 11b, and the crests 10b being similarly transversely aligned with the troughs 11a, across the width of the arm. The wave crests and troughs on each arm 4 are thus positioned in a keyed relationship with the troughs and wave crests on the other arm so that, when the arms are folded together, as shown in FIG. 1b, the crests 10a of each arm interfit with the troughs 11a of the other arm, and the crests 10b of each arm interfit with the troughs 11b of the other arm. Thus, above the base 1, the anchor 10 is substantially completely solid in cross section.

The plastic plug anchor 10 has a central rib 15 formed, on each of the arms 4, by transversely spacing apart the sets of wave crests and troughs on each arm. The hairline split or cleavage between juxtaposed portions of central rib 15 (the height of each portion of the rib being half the height of the wave trough to wave crest) serve to provide a narrow guide for the insertion of the screw 16. Thus, after the screw is inserted, it is thereby centrally oriented between the sets of wave crests 10a and 10b. Additionally, except for the narrow hairline cleavage between the juxtaposed portions of rib 15, a substantially solid material front is presented to an advancing screw. As shown in FIG. 1b, anti-rotation fins 6 are provided to serve the dual purpose of preventing rotation when a screw is inserted into the anchor through insertion starting hole 2, and they also wedge against the walls of a hole to prevent sinking when pressure is exerted by the screw on the anchor.

Figure 1C:
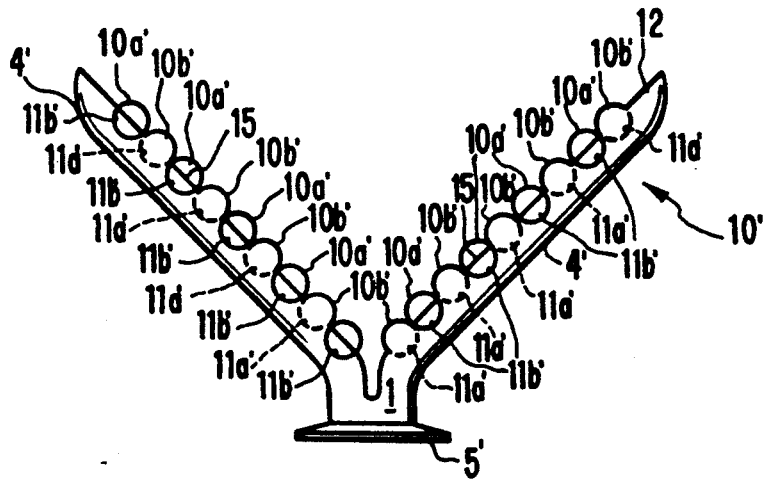
FIG. 1c is an alternative embodiment of the anchor of FIGS. 1a and b.

FIG. 1c depicts an alternative embodiment of the anchor of FIGS. 1a and b, wherein the arms 4' to base flange 5'. As with the anchor of FIGS. 1a and b, wave crests 10a' and 10b' fit into troughs 11a' and 11b' respectively to provide a substantially completely solid plug.

Figure 2:
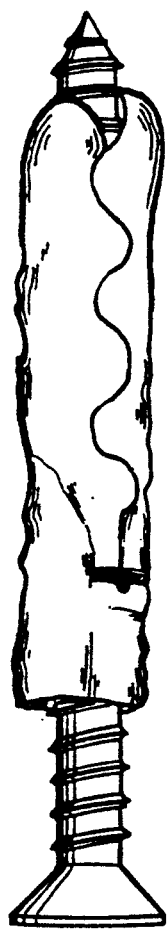
FIG. 2 is a side elevation (enlarged for detail) photographic view of the anchor of FIGS. 1a and 1b when used in accordance with the method of the prior art and removed from a substrate.

As shown in photographic FIG. 2, the anchor of FIG. 1b with an inserted screw of normal size, as used in the prior art, is extracted intact from a wall. The anchor is shown as being elongated to some extent with the exterior surface of the anchor remaining roughly cylindrical in substantially the same configuration as that of the anchor initially. In contrast thereto the anchor of photographic FIG. 3, in which the screw is matched to both the anchor and the hole, is elongated and a thin film with hooplike indentations is formed at the confining areas of the screw threads. The thin film covers the edges of the screw threads. Because of the high compression, the thin film becomes translucent and almost transparent in such regions. The raised areas between the hooplike indentations become highly compressed and, in the photograph shown, are about 15% greater in diameter than the hole from which the anchor was extracted.

Figure 4:
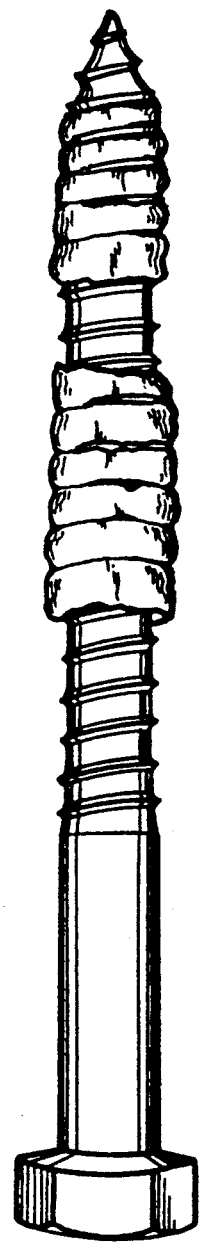
FIG. 4 is a side elevation (enlarged for detail) photographic view of the anchor of FIGS. 1a and 1b when the inserted screw diameter excessively exceeds that of the anchor and is removed from a substrate.

As shown in FIG. 4, utilization of a screw, with an excessively larger diameter than that of the anchor, results in the edges of the screw threads slicing through the anchor with material remaining only within the threads of the anchor. There is a substantial loss of holding power since the effectiveness of the anchor is negated by the segmentation of the anchor. Only residual holding between screw threads and the wall of the hole retain the screw in position.

In order to more fully appreciate the nature of the present invention the following examples are presented for illustrative purposes. It is understood that the examples are illustrative in nature and that details contained therein are not to be construed as limitations on the present invention.

EXAMPLE 1A (PRIOR ART)

A polypropylene anchor as shown in FIG. 1b with an outer diameter of 8 mm and a length of 39 mm is inserted into an 8 mm hole (having a depth in excess of 60 mm) in 24.1 N/mm$^2$ (3,500 psi) concrete block. A 6 mm screw (the recommended metric size) is threaded into the anchor and an increasing tensile load is applied to the screw head. The anchor begins to loosen at about 563 kg. FIG. 2 is a photograph of this anchor with inserted screw.

EXAMPLE 1B (PRIOR ART)

A $\frac{1}{4}''$ (6.35 mm) screw (the largest recommended UNC size) is inserted into a second 8 mm diameter anchor with the same anchor and hole dimensions. There is no significant increase in pull-out value over the anchor of Example 1A.

EXAMPLE 1C (PRIOR ART)

An anchor with an outer diameter of 5 mm and a length of 24 mm is inserted into a 5 mm hole (having a depth of at least 36 mm) in the same block and a 4 mm screw is threaded into the anchor. With a tensile load applied, the anchor begins to loosen at about 360 kg.

EXAMPLE 2

Figure 3:
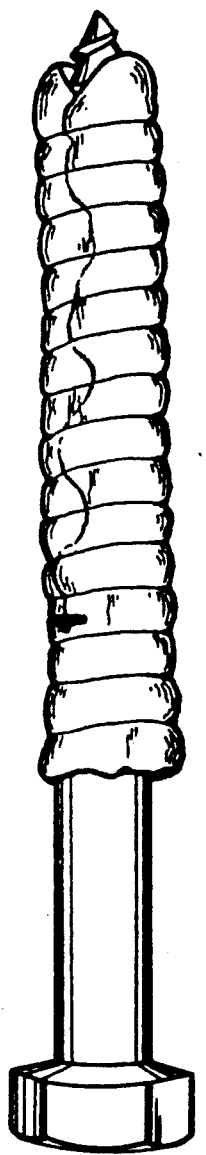
FIG. 3 is a side elevation (enlarged for detail) photographic view of the anchor of FIG. 2 when used in accordance with the method of the present invention and removed from a substrate.

A polypropylene anchor as in Examples 1A and 1B with an outer diameter of 8 mm is inserted into an 8 mm hole in 24.1 N/mm$^2$ concrete block. An 8 mm hex-head screw is easily threaded into the anchor (no block cracking or screw shearing) and an increasing tensile load is applied. The anchor begins to loosen at about 885 kg, a nearly 60% increase in holding power over the anchors of Examples 1A and 1B. FIG. 3 is a photograph of this anchor with inserted screw.

EXAMPLE 2A (MODIFIED PRIOR ART)

A nylon plug anchor having a central slotted hollow and original dimensions equivalent to the anchor of Example 2 is inserted into an 8 mm hole in 24.1 N/mm$^2$ concrete block. An 8 mm hex-head screw is threaded into the anchor and before the screw is fully seated, the screw shears in half.

EXAMPLE 3

A polypropylene anchor as Example 1C with an outer diameter of 5 mm is inserted into a 5 mm hole in 24.1 N/mm$^2$ concrete block. A 5 mm screw is threaded into the anchor and an increasing tensile load is applied. The anchor begins to loosen at about 500 kg, a nearly 40% increase in holding power over the anchor in Example 1C.

EXAMPLE 4

A polypropylene anchor as in Example 2 with an outer diameter of 8 mm is inserted into an 8 mm hole in 24.1 N/mm$^2$ concrete block. An 8 mm hex-head screw is threaded into the anchor and an increasing tensile load is applied. At 225 kg (about ¼ the ultimate load of the anchor in Example 2 to simulate the standard 4:1 safety load ratio) the load is released, and the screw is backed out. A second screw is re-threaded into the anchor and a second load is applied. The anchor holds in excess of 950 kg before beginning to loosen.

EXAMPLE 5 (PRIOR ART)

A polypropylene anchor as shown in FIG. 1A with an outer diameter of 6 mm and a length of 29 mm is inserted into a 6 mm hole (with a depth of 45 mm) in 24.1 N/mm$^2$ concrete block. A 5 mm screw is threaded into the anchor and an increasing tensile load is applied. The anchor begins to loosen at about 620 kg.

EXAMPLE 6

A polypropylene anchor as in Example 5 with an outer diameter of 6 mm is inserted into the 6 mm hole in 24.1 N/mm$^2$ concrete block. A ¼" (6.35 mm) screw is threaded into the anchor and an increasing tensile load is applied. The anchor begins to loosen at about 270 kg. Examination of the anchor after removal from the concrete block reveals that the threads of the screw had completely cut through the plastic of the anchor as is more clearly seen in FIG. 4.

It is understood that the above examples are illustrative in nature and that changes in material and dimension may be made without departing from the scope of the present invention as defined in the following claims.

What is claimed is:

1. A method for formation of a high strength anchoring element in a solid wall substrate, comprising the steps of:
   forming a hole having a predetermined diameter in said solid wall substrate;
   fully inserting a substantially solid, generally tubular shaped plastic plug anchor having a specific original length into said hole, said plastic plug anchor having a diameter substantially equal to said predetermined diameter of said hole, said plastic plug anchor comprised of a high shear strength material which is extrudible under increased pressure and temperature exerted by a screw to be inserted into said anchor;
   rotatably inserting a screw into said plastic plug anchor, said screw having a diameter substantially equal to the diameter of said plug anchor, thereby causing pressure to be exerted on the plastic material of said plug anchor and further causing said plastic material to become sufficiently heated, thereby extruding said plastic material with very high compression of said plastic between adjacent threads of said screw, thereby forming a very highly compressed film of plastic around a substantial portion of the outer edges of the threads of said screw and further extruding said plastic into imperfections in the surface created by said hole in said wall;
   wherein said hole having a diameter up to 0.02" (½ mm) larger than the diameter of said plastic plug and said screw having a diameter of ±0.02" (½ mm) relative to the diameter of said plastic plug anchor.

2. The method of claim 1 wherein said hole has a depth at least 30% more than the original length of the plastic plug.

3. The method of claim 1 wherein said plastic is selected from the group consisting of polypropylene, polyethylene and co-polymers of polypropylene and polyethylene.

4. The method of claim 1 wherein said screw has a sharp point whereby it penetrates the plastic plug in preference to pushing the plug towards the bottom of the hole.

5. The method of claim 4 wherein said screw has a hex-head configuration to facilitate said rotational insertion.

6. The method of claim 1 wherein said plug anchor further comprises longitudinal cleavages whereby an inserted screw is substantially guided thereby into a substantially central insertion within said plug and wherein the cleavages permit the plastic to substantially circumferentially enclose the screw.

7. The method of claim 6 wherein said cleavages comprise an interface between longitudinal elements of said plug anchor which interfit with each other to form said substantially solid, generally tubular shaped plastic plug.

8. The method of claim 1 wherein said plastic plug further comprises means to prevent rotation thereof with rotational insertion of said screw.

9. The method of claim 8 wherein said means to prevent rotation comprises two or more small extending fins at a peripheral edge of said plastic plug anchor exposed to insertion of said screw, with said fins adapted to be wedged between the plug and the wall of the hole, upon insertion of the plug anchor into the hole.

10. The method of claim 9 wherein said wedged fins further provide means to prevent sinking of the anchor within the wall caused by pressure of screw insertion.

* * * * *